Patented Feb. 9, 1932

1,844,388

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF NAPHTHALENE

No Drawing. Original application filed August 26, 1927, Serial No. 215,759. Divided and this application filed March 28, 1928. Serial No. 265,520.

This invention relates to processes of oxidizing naphthalene to intermediate products, such as alphanaphthaquinone, phthalic anhydride, maleic acid, etc.

According to the present invention, naphthalene is oxidized, particularly in the vapor phase, in the presence of catalysts or contact masses containing, when freshly prepared, zeolites which are the reaction products of at least three different classes of components and which in the specification and claims will be referred to as "multi-component zeolites." Some of the zeolites which are used in the new catalysts have been described and claimed as products in my application, Serial No. 142,783, filed October 19, 1926, now Patent No. 1,728,732, dated September 17, 1929, of which the present application is in part a continuation.

Zeolite forming components may be divided into three classes:—silicates with or without partial substitution of other suitable acidic oxides; metallates, such as alkali metal metallates; and salts of metals which are sufficiently amphoteric to form base exchange bodies when caused to react with silicates under conditions suitable for the production of zeolites. The ordinary zeolites of commerce are prepared by the reaction of a soluble silicate, either with alkali metal metallates or with metal salts. The catalysts of the present invention, on the other hand, are reaction products of a silicate with at least one metallate and at least one metal salt. The present invention is directed to processes of oxidizing naphthalene in the presence of such multi-component zeolites and their derivatives, in which at least one catalytically active element or radical is chemically combined with or in the zeolite. Both diluted and undiluted multi-component zeolite catalysts can be used in the present invention, but in many cases the use of diluted multi-component zeolites is preferable. In the diluted zeolite contact masses used in the present invention, the catalytic power may reside wholly in the zeolite or in chemical combination therewith, or it may reside partly in the zeolite and partly in diluents combined therewith to form mixtures or preferably physically homogeneous structures. In some cases diluents may be associated with catalytically ineffective multi-component zeolites, and such processes are included within the scope of the present invention.

All of the base exchange bodies used in the present invention, both diluted and undiluted, possess a remarkably porous, honeycomb-like structure, and are in many cases opalescent. When suitable catalytically active components are present, they form catalysts or contact masses of remarkable efficiency, due probably in part at least to the extraordinarily high surface energy of the microscopically porous structures, and probably also to the presence of unsaturated valences in many cases and a symmetry of the molecules. It is of course possible that the catalytic activity of the contact masses used in the present invention is due partly or wholly also to other reasons, and the present invention is therefore not intended in any sense to be limited to any theory of action of the products. The molecular complexes which are present in the products used in the present invention are apparently of great size and complexity, and the exact chemical constitution has not been determined, nor has it been determined definitely whether in all cases single chemical compounds are formed, and it is possible that in some cases at least molecular mixtures or solid solutions may be present. The products used possess a physically microscopical homogeneity, and behave in many ways as if they were single compounds, or in the case of diluted zeolites, the zeolite skeleton behaves as if it were a single compound, and I am of the opinion that probably in many cases at least the zeolites are actually in fact single compounds of high molecular weight.

It should be understood that the products used in the present invention are chemically quite distinct from zeolites formed by the reaction of a silicate with either metallates or with metal salts, the so-called two-component zeolites.

The products used in the present invention fall into three main types, depending on the relative proportions of the three classes of

Certain compounds such as for example, vanadates, molybdates, tungstates, tantalates and uranates, which are not ordinarily considered as metallates, but which are capable of forming base exchange bodies with soluble silicates and metal salts, are intended to be included under the term "metallates" as used in the present invention. I therefore include under this term any alkali metal compound of a metal acid which is capable of forming with soluble silicates and metal salts base exchange bodies, or which can be rendered capable of so reacting by a change of valence which can be effected during the reaction. Thus for example, certain alkali permanganates which are incapable of forming base exchange bodies containing heptavalent manganese may be caused to react with soluble silicates and metal salts in the presence of suitable reducing agents which reduce the permanganate to a stage of oxidation in which it is capable of behaving as a metallate. Such compounds are included under the classification of metallates for the purposes of the present invention, and some very valuable products can be produced by the use of this type of compound. An example of an important element which may be so used is tetravalent vanadium.

The present invention may utilize a single metallate component, or a plurality of metallate components in any desired ratio may be used. The following elements are included among those forming metallates which can be used:—aluminum, chromium, zinc, vanadium, beryllium, tin, palladium, osmium, platinum, titanium, zirconium, lead, tungsten, boron, molybdenum, uranium and tantalum, copper, nickel, iron, cobalt, silver, cadmium, manganese, bismuth, thorium, and cerium.

The metal salt components are likewise numerous, and in general, any water-soluble, acid, neutral or basic salts or any mixtures may be used. The following elements are included among those which form suitable salts:—copper, silver, gold, beryllium, zinc, cadmium, aluminum, rare earths, titanium, zirconium, tin, lead, thorium, chromium, uranium, vanadium, manganese, iron, nickel and cobalt.

The silicate component may be an alkali metal silicate or other silicate which is soluble in alkali or part of the silicate component may be substituted in part by alkaline salts of the acids of the following elements:— boron, phosphorus, sulfur, nitrogen, tin, tellurium, selenium, arsenic and antimony. All of these compounds are capable of forming base exchange bodies with the other components, and are therefore to be considered the equivalent of the silicates.

The range of the new products used in the present invention is not limited to the elements present in the components which particularly form the non-exchangeable nucleus of the zeolite. On the contrary, it is possible to substitute the alkali metal ions by other metal cations by means of base exchange. Thus for example, one or more of the following cations may be introduced:—ammonium, copper, silver, gold, beryllium, magnesium, calcium, zinc, strontium, cadmium, barium, aluminum, thallium, titanium, zirconium, tin, thorium, vanadium, chromium, uranium, manganese, iron, cobalt, nickel, palladium, and platinum. The elements or radicals may be introduced as simple or complex ions, or both, in any desired proportions. The introduction can be effected simultaneously or successively. The number of possible combinations by means of base exchange is of course very great, as will be readily apparent to a zeolite chemist. The number of new compounds is therefore greatly increased, and many valuable products, particularly catalysts or activators, can be produced by the introduction of suitable base exchange ions, which may increase the concentration of catalysts or activators in the product, or may result in a more finely tuned catalyst. The increase in catalytic activity which is frequently possible by a suitable introduction of the desired cations by base exchange frequently increases the permissible loading of the product in naphthalene oxidations and may increase resistance to high temperatures, the percentage yield which can be obtained thereby, or the output, or both.

A further series of catalysts can be obtained by treating the base exchange bodies of the present invention with compounds containing suitable acid radicals which form with the base exchange bodies salt-like bodies. While these products behave in many ways as if they were actual salts, the exact chemical constitution of the products is not definitely known, and the invention is not intended to be limited by any theory as to compositions.

For the purposes of the present invention, acids or salts of the following elements may be used in order to produce salt-like bodies:— vanadium, tungsten, uranium, chromium, molybdenum, manganese, selenium, tellurium, arsenic, phosphorus, sulfur, chlorine, bromine, fluorine, nitrogen and boron. Simple acids or their salts can be utilized, or polyacids, peracids and complex ions may be substituted wherever this is desirable. Other complex anions, such as ferro or ferrycyanogen, sulfocyanogen, other metal cyanogens, ammonia complexes and the like are useful wherever they form salt-like bodies with the base exchange bodies with which they are to react. One or more acid radicals may be introduced in the above described manner, either simultaneously or successively, and the amount of acid radicals introduced can be quantitatively varied so that by this means salt-like base exchange bodies having the characteristics of acid neutral or basic acid derivatives can be produced.

The diluted zeolites which I have found to be the most effective catalysts or contact masses for the oxidation of naphthalene can be prepared in a number of ways by the incorporation of a large variety of diluents, such as for example, highly porous diluents, as kieselguhr, glaucosil, "Celite" brick refuse, silicates, inactive zeolites, pumice meal, and other products, or they may be coated onto natural and artificial massive carrier fragments. The method of incorporating, and nature of diluents which are to be used, has been described in detail in the co-pending application of Alphons O. Jaeger and Johann A. Bertsch, Serial No. 95,771, filed March 18, 1926, where the incorporation of diluents in two component zeolites is described. While the present products are chemically quite different from zeolites which are prepared from two components, the methods of precipitation are analogous. I have found, therefore, that in most cases the same methods of incorporating diluents which have been described in the prior application, above referred to, in connection with two component zeolites, may be advantageously used for the incorporation of diluents in base exchange bodies used in the present invention. As described in the prior application, the diluents may be incorporated into the physical structure of the base exchange bodies, or the base exchange bodies can be formed in the interstices of relatively coarser diluents. Specific methods of incorporating diluents with base exchange bodies of the present invention will also be described in many of the specific examples which are to follow, it being understood of course that the invention is in no sense limited to the details of the examples which are illustrative modifications only.

The precipitation of the base exchange bodies is frequently slow, and sometimes incomplete, and it is often desirable to accelerate or complete the precipitation by heating, vigorous stirring, or by the addition of acids, either organic or inorganic, in liquid or gaseous form. Thus for example, hydrochloric acid, sulfuric acid, carbonic acid, nitric acid, acetic acid, formic acid and the like, or their acid salts, may be used. The addition of the acid is merely to decrease the excess of alkali and, of course, is stopped before the reaction becomes acid to phenolphthalein or litmus as the case may be. Ammonium salts and salts of the alkalies as well as halogens, alcohols and other organic substances, are frequently advantageous in accelerating precipitation, and are included in the scope of the present invention. In some cases, it is advantageous to operate under pressure in autoclaves, and the present invention is therefore not limited in its broader aspects to operations under any particular pressure.

The important property of porosity of base exchange products of the present invention may in many cases be enhanced by the incorporation with the bodies, during formation, of products which are readily removable either by volatilization, combustion or by leaching, leaving behind additional pores, and thus still further contributing to the permeability of the framework of the base exchange products. The removable products to be used may be inorganic or organic, and include a wide number of products, but the choice of products will of course depend on the characteristics of the base exchange body.

The production of base exchange bodies usually results in a considerable percentage of soluble salts in the reaction mixture, and it is generally desirable to wash out these salts and to dry the products preferably at moderate temperatures which may advantageously be below 100° C. Some of the products may contain too little alkali for the purposes for which they are to be used, or they may lack mechanical strength. These products may advantageously be washed or impregnated with a dilute waterglass solution, instead of with water, with a resulting silicification which considerably increases the mechanical strength of the product, and may also desirably affect its chemical constitution, particularly by changing its alkalinity or acidity.

I find that it is often advantageous to subject the catalysts and contact masses used in the present invention to a preliminary treatment, consisting, first, in a calcination in the presence of air or other gases as described in my prior Patents Nos. 1,678,626 and 1,678,627, issued July 24, 1928.

This preliminary treatment or the catalytic process itself, which takes place at high temperature, results in certain chemical changes in the catalyst or contact mass which are not well defined, and when the catalyst is referred to in the claims, it should be considered as of the time when it is freshly made, as is usual in catalytic chemical nomenclature.

The oxidation of naphthalene requires a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some cases. Where the stabilizers are oxides or hydroxides of the alkali-forming metals the catalyst is treated by calcination with acid gases to prevent the presence of strong alkalies in the catalyst when it is used. Other catalytically active or activating substances which enhance the effectiveness of the stabilizers, and which are termed stabilizer promoters, may also be used. In fact whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the oxidation of naphthalene may be considered, and act as stabilizer promoters. I do not claim in this application the use of stabilizers or stabilizer promoters in general, as these form the subject-matter of my prior Patent No. 1,709,853, dated April 23, 1929. The expressions "stabilizers" and "stabilizer promoters", when used in the present application, are to be understood as used in the sense in which they are defined in the aforementioned copending application. It should be understood that while many of the multi-component zeolite catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds are to be considered as stabilizer promoters.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular reaction in which he is interested.

*Example 1*

16 parts of vanadic acid are formed into a slurry with 300 parts of water and are acidified with sulfuric acid. The mixture is then heated to boiling and a rapid stream of sulfur dioxide is passed through the hot solution. In a short time, a blue solution of vanadyl sulfate is formed. After boiling out the excess sulfur dioxide, the blue solution is divided into two portions in the ratio of 2:3. 3/5ths of the blue solution are cautiously treated with a concentrated caustic potash solution until a clear brown solution of potassium vanadite is formed. 140 parts of potassium waterglass of 39° Bé. are diluted with 500 parts of water and the potassium vanadite is poured in with vigorous stirring. Into the mixture are stirred 60-80 parts of "Cenite" brick refuse. The mixture is then gently warmed and the remaining 2/5ths of the vanadyl sulfate is added in a thin stream with vigorous agitation, whereupon the mass first solidifies to a gray-green gel and on further stirring is transformed into readily filterable granular aggregates.

The amount of alkali used in the solutions should be so chosen so that at the end of the reaction the mixture remains weakly alkaline or neutral to phenolphthalein. If the alkalinity of the reaction mixture is much greater, the precipitation is delayed but can be accelerated by the addition of about 50 parts of a saturated potassium sulfate solution which, by its salting out effect, improves the yield.

Another method of accelerating precipitation is to reduce the alkalinity of the reaction mixture by cautious addition of dilute acids or solutions of acid salts, such as for example, hydrochloric acid, sulphuric acid, potassium bisulfate, and the like. By this means any desired degree of alkalinity or neutrality of the resulting reaction product can be easily obtained.

The reaction mixture is allowed to stand and is then decanted, pressed and washed with water. The press-cake is dried preferably below 100° C. and the three component base exchange body containing $SiO_2$ and $V_2O_4$ is then broken into fragments or is hydrated with water in which case it also breaks into granules. The final product is a light gray, hard body having conchoidal fracture and possesses base exchange properties.

The base exchange body may be dehydrated by heating in a stream of hot air and carbon dioxide, and is then given a preliminary treatment with a stream of dilute burner gases at 400–500° C. The contact mass, after the preliminary treatment, is filled into a converter and naphthalene vapors mixed with air in the ratio of 1:18 are passed over the contact mass at 370–420° C. A good yield of phthalic anhydride is obtained.

*Example 2*

Three mixtures are prepared as follows:
(1) 210 to 250 parts of potassium or sodium waterglass solution 33° Bé. diluted with 15 to 20 volumes of water are mixed with kieselguhr or other material rich in $SiO_2$ such as glaucosil, the acid treated residue of greensand, until a suspension is obtained which is just stirable.
(2) 18 parts of $V_2O_5$ are dissolved in just sufficient 10–20% caustic potash or caustic soda solution so that potassium or sodium vanadate is obtained.
(3) 18 parts of $V_2O_5$ are reduced with sulphur dioxide in aqueous suspension in the usual way to form the blue vanadyl sulfate about 200 to 300 parts of water being needed. The excess $SO_2$ is removed by boiling.

Mixtures (1) and (2) are poured together and solution (3) is permitted to flow in with vigorous agitation, taking care that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in non-exchangeable form and having materials rich in $SiO_2$ finely distributed throughout its framework.

The contact mass, before use, is treated at 400 to 500° C. with about 3% burner gases and the product obtained becomes an excellent contact mass for the catalytic oxidation of naphthalene to alphanaphthaquinone, phthalic anhydride and maleic acid under conditions suitable for each of these reaction products. Among these conditions may be mentioned temperature at which the catalytic oxidation of naphthalene is carried out, the time of the reaction, mixture of naphthalene and air, the proportion of the catalyst to the reacting gases and the relative proportions of naphthalene and oxygen to the diluent gases such as carbon dioxide and nitrogen.

Naphthalene and air mixed in the ratio of 1:16 are passed over the contact mass at 380 to 420° C. and produce phthalic anhydride. Naphthalene and air mixed in the ratio of 1:40 when passed over the contact mass at 360 to 390° C. produce large amounts of alphanaphthaquinone in addition to phthalic anhydride. When temperatures of 420 to 500° C. are used in the manufacture of phthalic anhydride, the phthalic anhydride contains considerable amounts of maleic acid.

A further improvement of these contact masses for several specific catalytic oxidation reactions can be effected by forming salt-like bodies of the three component base exchange body with acids of the elements of the 5th and 6th group of the periodic system, especially vanadium, tungsten, and molybdenum.

A further modified method of preparing highly efficient contact masses consists in introducing in the diluents, before use, vanadates, molybdates, tungstates, chromates or tantalates, especially of the heavy metals. For this purpose the diluents may be impregnated with 3 to 5% of such metallates in the usual way whereby very effective catalysts for the catalytic oxidations of many of the aforesaid hydrocarbons are obtained.

Example 3

Three mixtures are prepared as follows:

(1) 210 parts of potassium waterglass solution of about 33° Bé. diluted with 6–8 volumes of water are mixed with a mixture of comminuted silicates and kieselguhr until the suspension remains easily stirrable. The mixed diluent of silicates and kieselguhr contains preferably more than 25% of kieselguhr. The limits for the addition of the amount of diluents can be chosen throughout large range without affecting the catalytic efficiency of the final product to any great extent.

(2) 18 parts of $V_2O_5$ are reduced in a hot aqueous solution acidified with $H_2SO_4$ to a blue vanadyl sulphate solution by means of sulphur dioxide and the vanadyl sulphate obtained is transformed into a brown solution of potassium vanadite by treatment with sufficient 10 N. caustic potash solution in the usual way.

(3) A sufficient amount of 10% aluminum sulphate solution is prepared.

Suspension (1) and solution (2) are poured together and a sufficient amount of aluminum sulphate solution is added in a thin stream with vigorous agitation to bring the reaction mixture to neutrality to phenolphthalein or to a point which is just on the alkaline side. The mass solidifies to a dirty green gel which is filtered with suction, lightly washed and dried, constituting a diluted base exchange body which contains tetravalent vanadium, aluminum and $SiO_2$ in non-exchangeable form.

The diluents can also be suspended in the solution (2) or in the mixture of the suspension (1) and solution (2) with the same result.

Solutions (2) can be substituted in part or in whole by corresponding amount of potassium vanadate solution dissolving the $V_2O_5$, without reduction, directly in 2 N. potassium hydroxide. In this case a gel is produced which contains $V_2O_4$ and $V_2O_5$, $Al_2O_3$ and $SiO_2$ corresponding to the three classes of components used in the initial solutions.

The solution 3 can also be substituted in part or in whole by other metal salt solutions, such as, for example, copper sulphate, nickel sulphate, cobalt sulphate, iron sulphate, manganese nitrate, ferric chloride and the like, singly and in admixture.

The bodies can also be changed after drying preferably at 100° C. by base exchange or by the formation of salt-like bodies, whereby the broken base exchange body is first hydrated by trickling water over it.

The base exchange bodies are transformed to salt-like bodies by spraying a diluted $H_2SO_4$ and $HNO_3$ over the mass or by heating the mass to 420 to 500° C. and passing 3 to 5% burner gases over it, and are very efficient contact masses for the catalytic oxidation of naphthalene to phthalic anhydride when naphthalene and air mixed in the ratios of from 1:16 to 1:30 are passed over the contact mass at 370–420° C. The yields of phthalic anhydride are between 85–88% of the theory.

Example 4

12 parts of $V_2O_5$ are suspended in 300 parts of water to form a slurry, acidified with 3 to 6 parts of concentrated sulphuric acid and then reduced to the blue vanadyl sulphate by well known reducing means as, for example, by means of gases containing $SO_2$ which are passed in the solution at the boiling temperature.

108 parts of waterglass solution of 33° Bé. are diluted with 400 parts of water and about 80 to 100 parts of "Celite" brick refuse are stirred in.

The waterglass solution is then poured into the vanadyl sulphate solution with vigorous agitation precipitating out vanadyl silicate diluted with "Celite" brick refuse. Care should be taken that after all the solutions have reacted the resulting mixture must be neutral to litmus, which can be adjusted with the help of small amounts of N. sulphuric acid.

150 parts of potassium waterglass solution of 33° Bé. are diluted with 300 parts of water.

6 parts of $V_2O_5$ are transformed with the help of N.KOH solution to potassium metavanadate and the waterglass solution and vanadate solution are mixed together.

40 parts of $Al_2(SO_4)_3$ 18 aq. are dissolved in 250 parts of water.

To this latter solution the ground, diluted vanadyl silicate is added with vigorous agitation in order to bring it in a suspension, then the mixture of the two solutions of waterglass and vanadate are added in a thin stream with vigorous agitation.

The reaction mixture after the addition of the mixed solutions must be neutral or alkaline to phenolphthalein and the desired neutrality or alkalinity can easily be adjusted by using corresponding amounts of N. sulphuric acid with vigorous agitation. The reaction mixture is separated from the mother liquor in the usual way and washed with twice the amount of the mother liquor obtained, dried and broken in suitable pieces.

In order to use this contact mass for the catalytic oxidation of naphthalene to alpha-naphthaquinone and phthalic anhydride it is preferable to treat the calcined contact mass with about 3% diluted $SO_2$—containing gases at 450 to 500° C., the $SO_2$ being transformed into $SO_3$ and the latter neutralizing the alkali content of the base exchange body.

Naphthalene mixed with air in the ratio of 1:20 is passed over this contact mass, and gives excellent yields of phthalic anhydride at 370 to 420° C. If the amount of air is largely increased, considerable amounts of alphanaphthaquinone are obtained in addition to phthalic anhydride.

Instead of using a potassium vanadate solution as the metallate component other catalytically active metallates, such as, tungstates and molybdates, may be used.

Instead of using an aluminum sulphate solution as the metal salt component other metal salts, such as those of iron, copper, silver, nickel, cadmium, titanium, zirconium and chromium may be used singly or in admixture, contact masses with specific efficiency for other oxidation reactions being produced.

Example 5

A mixture of 10 parts of $V_2O_5$ and 4 parts of $WO_3$ are dissolved in 300 parts of diluted KOH solution containing about 10.5 parts of 90% KOH. To this solution about 90 parts of "Celite" brick refuse or a mixture of comminuted quartz and diatomaceous earth equal in volume to the "Celite" brick refuse are added with vigorous agitation. Other diluents, as described in former examples, are also applicable, for example pumice.

The suspension is heated up to 80 or 90° C. and is gradually made faintly acid to congo, using 2 N. sulphuric acid in order to precipitate out $V_2O_5$ and $WO_3$, in this diluent, or, in the mixture of the diluents. The mixture obtained is then dried and ground.

40 parts of 33° Bé. potassium waterglass solution are weighed out.

2 parts of $Al_2O_3$ are transformed to the corresponding potassium aluminate in the usual way with the help of 5 N. potassium hydroxide solution.

The two solutions are then mixed together and, immediately after mixing, kneaded thoroughly with the $V_2O_5$ and $WO_3$ precipitate and then formed into suitable pieces. These formed pieces are then dried at temperatures under 100° C. preferably with gases containing $CO_2$, whereby a diluted three component base exchange body is obtained containing $V_2O_5$, $WO_3$, $Al_2O_3$ and $SiO_2$ in non-exchangeable form. The contact mass so obtained is calcined with 3 to 6% $SO_2$ gases containing a sufficient amount of oxygen, first at room temperature and then at 450 to 500° C.

This contact mass is well suited for the catalytic oxidation of naphthalene to phthalic anhydride, when naphthalene vapors and air at various ratios, such as, 1:18 by weight, are passed over the catalyst at 380 to 400° C. whereby high percentage yields of phthalic anhydride are obtained. Instead of using $V_2O_5$ and $WO_3$ other catalytically effective components such as those containing metal elements of the 4th and 6th groups of the periodic system may be used in the same way to produce analogous products. Examples of such components are $V_2O_4$, $MoO_3$, $Ta_2O_5$ and $UO_3$, they may be used singly or in admixture, with or without $V_2O_5$ and $WO_3$.

Instead of using potassium aluminate other metallates of elements with amphoteric properties can be used, such as, cadmium, beryllium, and zinc.

Example 6

(1) 20 parts of $V_2O_5$ are dissolved in 150 to 200 parts of water containing about 17 parts of 90% KOH.

(2) 6 parts of $CuSO_4$ 5 aq. are dissolved in 150 to 200 parts of water and concentrated ammonia solution is added until a clear blue solution of cuprammonium complex is obtained.

(3) 2 parts of freshly precipitated $Al_2O_3$ are dissolved in the corresponding amount of 2N.KOH solution in order to form potassium aluminate.

(4) 80 parts of potassium waterglass of 33° Bé. are diluted with twice the amount of water and of 10% ammonia is added until the cloudy precipitate first obtained is again dissolved.

(5) 42 parts of $Fe_2(SO_4)_3$ plus 9 aq. are dissolved in 200 parts of water.

The aluminate and cuprammonium complex solutions are poured together and 80 to 90 parts of unground infusorial earth are added in order to form a suspension of the diluent with the mixture. The mixture of the vanadate and waterglass solution are then added with vigorous agitation and the ferri-sulphate solution is poured in a thin stream. The reaction mixture remains alkaline to phenolphthalein and can be adjusted to neutrality or slight alkalinity to phenolphthalein by adding $N.H_2SO_4$. The product so obtained is freed from the mother liquor by filtering and pressing and is washed out with about 300 parts of water in portions. The presscake is then dried at temperatures preferably below 100° C. and broken into small fragments. The three component zeolite obtained contains vanadium, copper, aluminum, iron, and $SiO_2$ in non-exchangeable form diluted with unground infusorial earth. Before use, this contact mass is calcined with air at 400° C. in order to dehydrate the mass.

After a preliminary treatment with diluted burner gases at about 450° the mass obtained is well suited for the catalytic oxidation of naphthalene to phthalic anhydride. Naphthalene vapors mixed with air in various ratios, such as 1:16 are passed over the contact mass at 380 to 400° C. whereby high percentage yields are obtained.

In the claims the catalyst is defined as of the time when it is freshly prepared. Calcination with or without acid gases or the conditions of the catalytic reaction itself will remove the base exchanging power of the multi-component zeolite either by dehydration or chemical reaction. It should be understood that the claims are intended to define the catalyst as of the time when freshly prepared, but of course the claims do not include catalysts which have been subjected to subsequent chemical treatment other than calcination with or without acid gases as described in the specification.

This application is a division of my application Serial No. 215,759, filed August 26, 1927, now Patent No. 1,722,297, dated July 30, 1929.

What is claimed as new is:

1. A method of oxidizing naphthalene to intermediate products, which comprises vaporizing naphthalene and causing the vapors to react with an oxidizing gas in the presence of a contact mass containing at least one compound selected from the group consisting of zeolites which are the reaction products of a soluble silicate with at least one metallate and at least one salt, the positive acting radical of which contains a metal capable of entering into the non-exchangeable portion of a zeolite molecule and salt-like derivatives of such zeolites by reaction with an anion capable of forming salt-like bodies therewith.

2. A method of oxidizing naphthalene to intermediate products which comprises vaporizing naphthalene and causing the vapors to react with an oxidizing gas in the presence of a contact mass containing at least one compound selected from the group consisting of diluted zeolites which are the reaction products of a soluble silicate with at least one metallate and at least one salt, the positive acting radical of which contains a metal capable of entering into the non-exchangeable portion of a zeolite molecule and salt-like derivatives of said diluted zeolites by reaction with an anion capable of forming salt-like bodies therewith.

3. A method of oxidizing naphthalene to intermediate products, which comprises vaporizing naphthalene and causing the vapors to react with an oxidizing gas in the presence of a contact mass containing at least one compound selected from the group consisting of zeolites which are the reaction products of a soluble silicate with at least one metallate and at least one salt the positive acting radical of which contains a metal capable of entering into the non-exchangeable portion of a zeolite molecule and salt-like derivatives of such zeolites by reaction with an anion capable of forming salt-like bodies therewith, at least one catalytically active component of the contact mass being chemically combined with the zeolite.

4. A method of oxidizing naphthalene to intermediate products, which comprises vaporizing napthalene and causing the vapors to react with an oxidizing gas in the presence of a contact mass containing at least one zeolite which is the reaction product of a soluble silicate with at least one metallate and at least one salt, the positive acting radical of which contains a metal capable of entering into the non-exchangeable portion of a zeolite molecule, at least one catalytically active component of the contact mass being chemically combined with the zeolite in non-exchangeable form.

5. A method of oxidizing naphthalene to intermediate products, which comprises vaporizing naphthalene and causing the vapors to react with an oxidizing gas in the presence of a contact mass containing at least one diluted zeolite which is the reaction product of a soluble silicate with at least one metallate and at least one salt, the positive acting radical of which contains a metal capable of entering into the non-exchangeable portion of a zeolite molecule, at least one catalytically effective component of the contact mass being physically associated with the zeolite in the form of a diluent.

6. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt, the positive acting radical of which contains a metal capable of entering into the non-exchangeable portion of a zeolite molecule in which chemically combined vanadium is present.

7. A method of oxidizing naphthalene to intermediate products, which comprises vaporizing naphthalene and causing the vapors to react with an oxidizing gas in the presence of a contact mass containing at least one diluted zeolite which is the reaction product of a soluble silicate with at least one metallate and at least one salt, the positive acting radical of which contains a metal capable of entering into the non-exchangeable portion of a zeolite molecule, at least part of the diluents containing vanadium compounds.

Signed at Pittsburgh, Pennsylvania, this 21st day of March, 1928

ALPHONS O. JAEGER.